United States Patent [19]
Kawamura

[11] Patent Number: 5,644,912
[45] Date of Patent: Jul. 8, 1997

[54] SYSTEM FOR DIAGNOSING DETERIORATION OF CATALYST IN EXHAUST SYSTEM OF INTERNAL COMBUSTION ENGINE

[75] Inventor: Katsuhiko Kawamura, Yokohama, Japan

[73] Assignee: Nissan Motor Co., Ltd., Yokohama, Japan

[21] Appl. No.: 503,256

[22] Filed: Jul. 17, 1995

Related U.S. Application Data

[63] Continuation of Ser. No. 104,569, Aug. 11, 1993, abandoned.

[30]    Foreign Application Priority Data

Aug. 27, 1992 [JP] Japan ................ 4-228107

[51] Int. Cl.$^6$ ............................................. F01N 3/28
[52] U.S. Cl. ...................... 60/276; 60/277; 60/285
[58] Field of Search ............................ 60/276, 277, 285

[56]            References Cited
           U.S. PATENT DOCUMENTS 4,130,095  12/1978  Bowler ........................ 60/276
5,018,348   5/1991  Durschmidt .................. 60/277
5,220,788   6/1993  Kurita ........................... 60/277

FOREIGN PATENT DOCUMENTS 63-205411  8/1988  Japan .
3-057862   3/1991  Japan .

*Primary Examiner*—Douglas Hart
*Attorney, Agent, or Firm*—Foley & Lardner

[57]            ABSTRACT

In an internal combustion engine, first and second oxygen sensors are installed in an exhaust system at positions upstream and downstream of a three-way catalytic converter. An air-fuel ratio control device usually controls the air-fuel ratio of mixture fed to the engine in accordance with an output issued from the first oxygen sensor. The control device is capable of correcting, upon a given diagnosing mode thereof, the air-fuel ratio of mixture to a generally stoichiometric value in accordance with a rich/lean reverse of an output issued from the second oxygen sensor. A time lag detecting device detects the elapsed time from the time on which the output from the oxygen sensor carries out a rich/lean reverse to the time on which the output from the second oxygen sensor carries out a corresponding rich/lean reverse. A judging device judges a deterioration degree of the catalyst in accordance with the time lag.

26 Claims, 10 Drawing Sheets

(a) OUTPUT OF O2 SENSOR (b) FEEDBACK CORRECTION FACTOR($\alpha$)

FIG.10
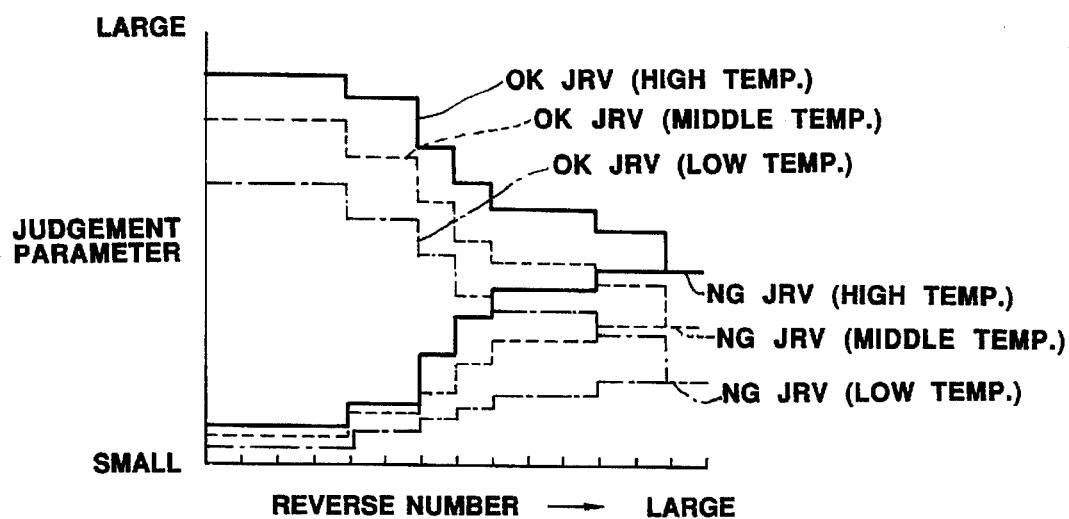
FIG.11(A) UPSTREAM O2 SENSOR
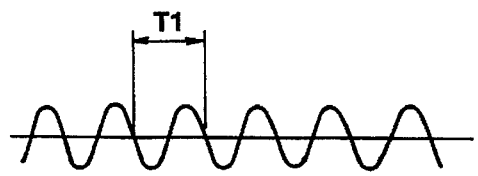
FIG.11(B) DOWNSTREAM O2 SENSOR (SUFFICIENTLY ACTIVE)
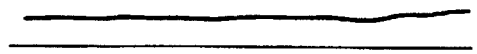
FIG.11(C) DOWNSTREAM O2 SENSOR (SEVERLY DETERIORATED)
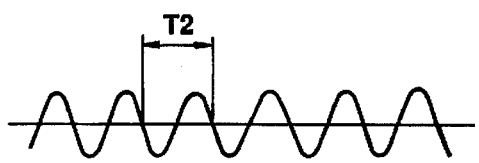
ELAPSED TIME →

SYSTEM FOR DIAGNOSING DETERIORATION OF CATALYST IN EXHAUST SYSTEM OF INTERNAL COMBUSTION ENGINE

This application is a continuation of application Ser. No. 08/104,569, filed Aug. 11, 1993, now abandoned.

BACKGROUND OF THE INVENTION

1. Field of the Invention

The present invention relates in general to systems for diagnosing a catalytic converter arranged in an exhaust system of an internal combustion engine, and more particularly to systems for diagnosing the deterioration of the catalyst of a three-way type catalytic converter in the exhaust system of the internal combustion engine by using output signals issued from respective air-fuel ratio sensors arranged upstream and downstream of the converter.

2. Description of the Prior Art

In order to clarify the task of the present invention, one conventional catalyst deterioration diagnosing system of the above-mentioned type will be outlined prior to making a detailed explanation of the present invention, which conventional system is shown in, for example, Japanese Patent First Provisional Publications Nos. 63-205441 and 3-57862.

That is, in such publications, there is described a so-called "air-fuel ratio feedback control system" in which two air-fuel ratio sensors (viz., oxygen sensors) are arranged upstream and downstream of a three-way catalytic converter in an exhaust system of an internal combustion engine, and in which the air-fuel ratio feedback control is carried out by using basically the output signal from the upstream sensor. The output signal from the downstream sensor is used for correcting the feedback control in a so-called "learning control" fashion.

The air-fuel ratio control system has further a catalyst deterioration diagnosing system incorporated therewith, which carries out a catalyst deterioration diagnosis by using or comparing the output signals from both the upstream and downstream sensors.

The diagnosing system is provided by practically embodying the fact that the deterioration degree of the catalyst (viz., catalytic converter rhodium) and the oxygen storage ability of the same have a certain correlation with each other.

During execution of the air-fuel feedback control, the amount of fuel fed to the engine is controlled in a proportional-plus-integral controlling fashion substantially based on the output signal from the upstream oxygen sensor. The upstream sensor thus issues such an output signal as shown in FIG. 11(a) in which richer and leaner conditions repeat periodically. While, the downstream sensor issues such an output signal as shown in FIG. 11(b) in which the amplitude of the signal is very small and the periodic cycle of the same is very elongated as compared with that of the upstream sensor. This is because the fluctuation of oxygen concentration remained in the gas exhausted from the converter is greatly moderated by the oxygen storage ability of the catalyst.

When, due to a prolonged usage or so, the catalyst of the three-way catalytic converter becomes poor in the catalytic activity, the oxygen storage ability of the same is lowered. Under this condition, the oxygen concentration in the exhaust gas upstream of the converter and that in the exhaust gas downstream of the converter fail to show a satisfactorily marked difference. That is, under such condition, as is seen from FIG. 11(c), the downstream sensor is forced to issue an output signal which is similar to that (viz., the signal of FIG. 11(a)) from the upstream sensor.

In the conventional deterioration diagnosing system disclosed in the above-mentioned publications, the ratio (viz., T1/T2) between the rich/lean reverse period "T1" of the signal from the upstream oxygen sensor and that "T2" of the signal from the downstream oxygen sensor is derived, and when the ratio "T1/T2" exceeds a predetermined value, it is judged that the catalyst in the converter has been severely deteriorated. However, due to the nature of the system, usage of the rich/lean reverse period "T2" of the output signal from the downstream sensor as a factor for judging the catalyst deterioration fails to evaluate the catalyst deterioration in a quantitative manner. That is, in the conventional diagnosing system, the criterion for the judgement of the severe deterioration of catalyst can not be set up at will. This will be understood from the graph of FIG. 12 which shows a relationship between the oxygen storage ability of the converter and the ratio (viz., T1/T2) of rich/lean reverse period between the output signals from the upstream and downstream sensors. When the catalyst is deteriorated to a certain degree, the rich/lean reverse of the output signal from the downstream sensor becomes generally synchronized with the rich/lean reverse of the output signal from the upstream sensor. Thus, under this condition, even in both regions having a deterioration smaller and greater than the certain degree, more detailed diagnosis for the catalyst deterioration is not expected. This tends to induce an undesirable condition wherein the severe deterioration may be judged even when a significant catalytic activity is still remained in the catalyst.

SUMMARY OF THE INVENTION

It is therefore an object of the present invention to provide a system for diagnosing deterioration of a catalyst of a three-way catalytic converter installed in an exhaust system of an internal combustion engine, which system is free of the above-mentioned drawbacks.

According to the present invention, there is provided a system for diagnosing deterioration of a catalyst of three-way catalytic converter installed in an exhaust system of an internal combustion engine. The system comprises first and second oxygen sensors installed in the exhaust system at respective positions upstream and downstream of the converter; an air-fuel ratio control means which usually controls the air-fuel ratio of mixture fed to the engine in accordance with an output signal issued from the first oxygen sensor, the control means being capable of correcting, upon a given diagnosing mode thereof, the air-fuel ratio of mixture to a generally stoichiometric value in accordance with a rich/lean reverse of an output signal issued from the second oxygen sensor; a time lag detecting means which detects the elapsed time from the time on which the output signal from the first oxygen sensor carries out a rich/lean reverse to the time on which the output signal from the second oxygen sensor carries out a corresponding rich/lean reverse; and a judging means which judges a deterioration degree of the catalyst in accordance with the time lag.

BRIEF DESCRIPTION OF THE DRAWINGS

FIG. 10 is judging table similar to FIG. 6, but showing a fourth embodiment wherein the judgement reference value is varied in accordance with the temperature of catalyst;

FIGS. 11(A) to 11(C) are charts showing respectively output signals from upstream and downstream oxygen sensors, which charts are provided for explaining a conventional catalyst deterioration diagnosing system.

DETAILED DESCRIPTION OF THE INVENTION

Figure 1:
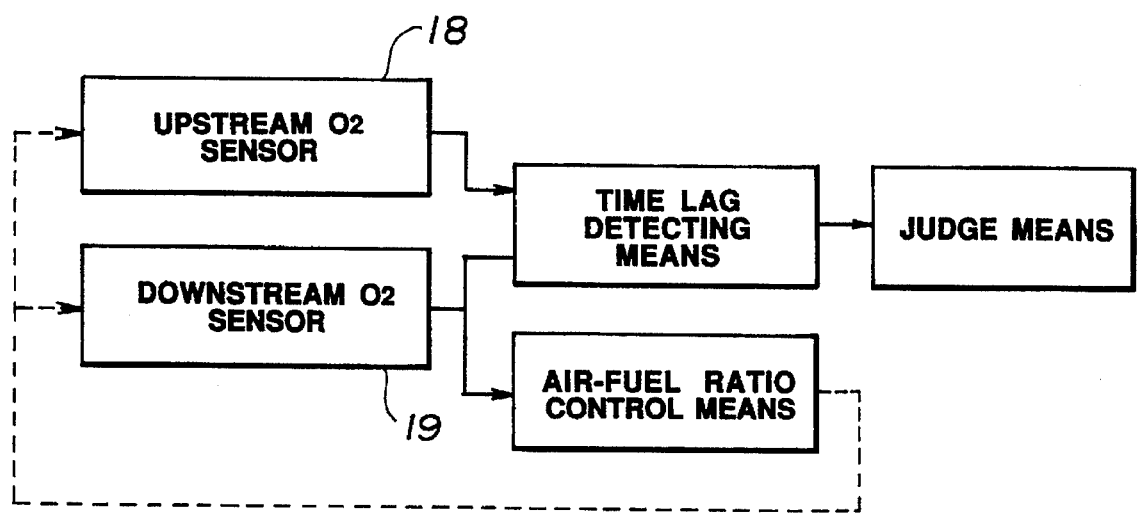
FIG. 1 is a block diagram showing the concept of the present invention.
Figure 2:
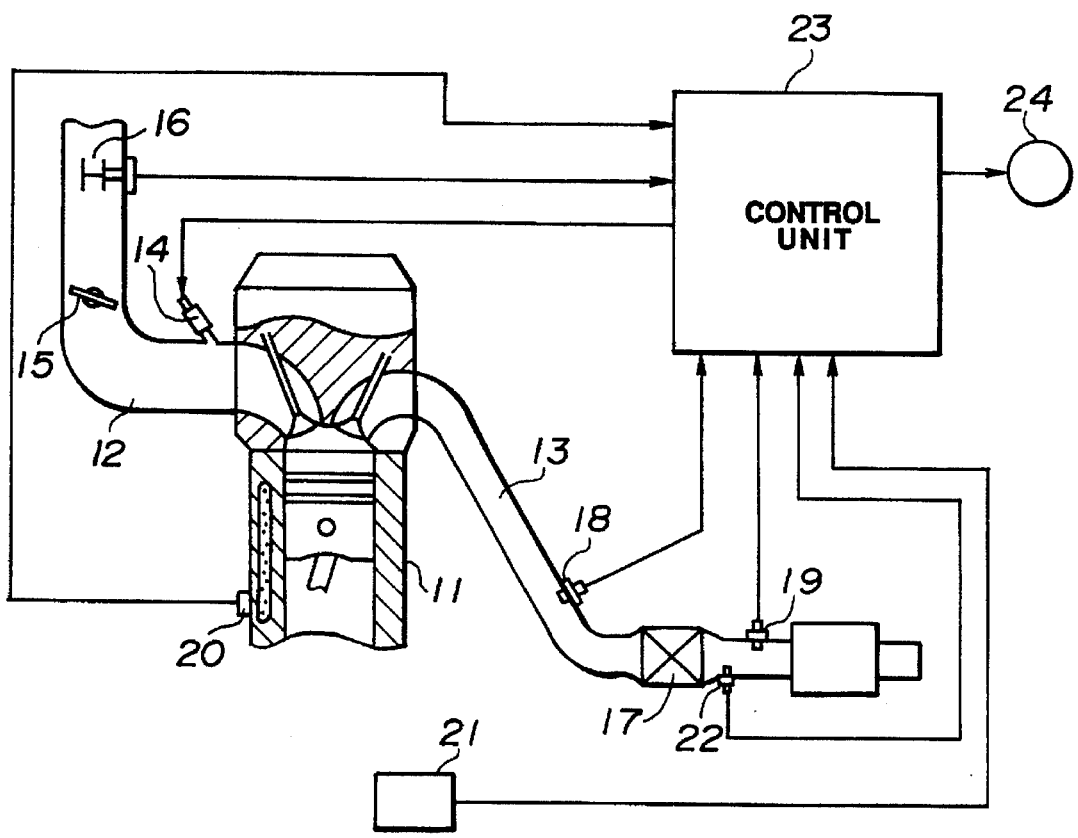
FIG. 2 is a schematic block diagram of a first embodiment of the present invention.

Referring to FIG. 2 of the drawings, there is shown a schematically illustrated internal combustion engine to which the present invention is practically applied.

Designated by numeral 11 is an internal combustion proper which has an air intake passage 12 and an exhaust gas passage 13. The air intake passage 12 has a plurality of fuel injection valves 14 which are arranged to feed fuel to respective combustion chambers through intake ports. A throttle valve 15 is installed in the air intake passage 12 at a position upstream of the fuel injection valves 14. An air flow meter 16 is further installed in the air intake passage 12 at a position upstream of the intake valve 15. The air flow meter 16 may be of a known hot-wire type. Although not shown in the drawing, an air filter is mounted on a top of the air intake passage 12 to clean air fed to the engine proper 11.

The exhaust gas passage 13 has a three-way type catalytic converter 17 installed therein at a position upstream of a muffler 25. As is known, the three-way type converter is a converter designed to reduce HC, CO and NOx in the exhaust gas. The exhaust gas passage 13 has two oxygen sensors 18 and 19 installed therein at positions upstream and downstream of the converter 17. For ease of description, these sensors 18 and 19 will be referred to upstream and downstream oxygen sensors hereinafter. Each sensor 18 or 19 generates electromotive force in accordance with concentration of oxygen contained in the exhaust gas and shows a steep change of the electromotive force at the stoichiometric value of air-fuel ratio.

Designated by numeral 20 is a water temperature sensor which senses the temperature of cooling water of the engine proper 11, and designated by numeral 21 is a crankangle sensor which, for obtaining an engine speed, issues a pulse signal for each given crankangle. Designated by numeral 22 is a temperature sensor which detects the temperature of exhaust gas discharged from the converter 17. The temperature in the converter 17 is thus indirectly sensed by the temperature sensor 22.

Output signals produced by the sensors 16, 20, 18, 19, 22 and 21 are fed to a control unit 23 which contains a microcomputer. By analyzing information possessed by the output signals given by such sensors, the control unit 23 controls the injection valves 14 to adjust the amount of fuel fed to each combustion chamber of the engine 11. That is, a so-called feedback control for the air-fuel ratio is carried out by usage of the information signals from the upstream and downstream oxygen sensors 18 and 19.

In addition, the control unit 23 carries out a catalyst deterioration diagnosis which will be described hereinafter. That is, when it is judged that the catalyst is deteriorated to a certain degree, an alarm lamp 24 is lighted.

First, the air-fuel ratio control will be described. In this control, from an intake air amount "Q" detected by the air flow meter 16 and an engine speed "N" detected by the crankangle sensor 21, there is derived a basic pulse width "Tp" (viz., basic fuel injection quantity) by using the following equation:

$$Tp = (Q/N) \times k \quad (1)$$

wherein:
k: constant

Then, the basic pulse width "Tp" is weighted and/or corrected to obtain a drive pulse width "Ti" (viz., fuel quantity practically injected) by using the following equation:

$$Ti = Tp \times COEF \times \alpha + Ts \quad (2)$$

wherein:
COEF: various correction factors
$\alpha$: feedback correction factor
Ts : voltage correction factor The various correction factors "COEF" include a factor based on the temperature of the cooling water, a factor based on the load applied to the engine and the like.

Figure 3A:
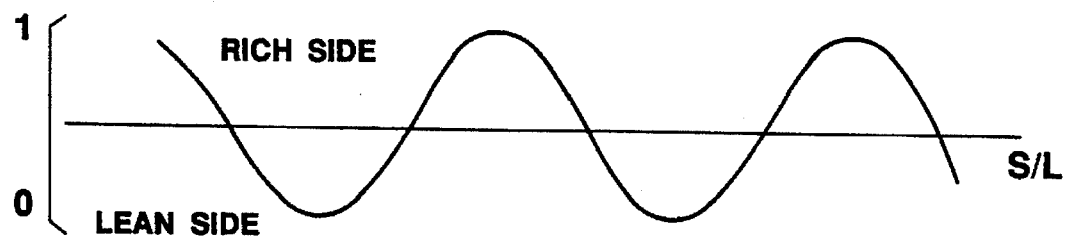
FIGS. 3(A) and 3(B) are charts showing respectively an output signal from an upstream oxygen sensor and a feedback correction factor.
Figure 3B:
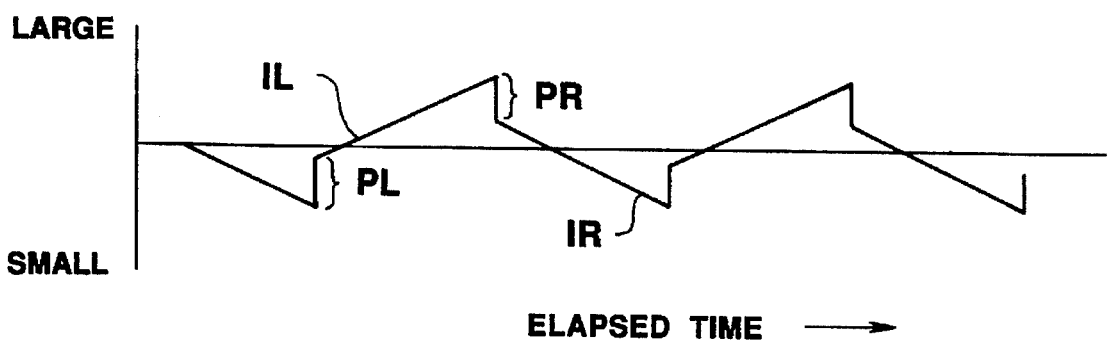

The voltage correction factor "Ts" is used for compensating the time for which the fuel injection valves 14 have failed to make normal operation due to lowering in voltage applied thereto. That is, the factor "Ts" varies in accordance with the voltage of a battery. The feedback correction factor "$\alpha$" is derived based mainly on the output signal issued from the upstream oxygen sensor 18. That is, the output signal from the sensor 18 is compared with a predetermined slice level (viz., the level corresponding to stoichiometric air-fuel ratio) and treated in a proportional-plus-integral deriving manner based on the rich/lean reverse thereof. That is, when the factor "$\alpha$" is greater than "1", the air-fuel ratio is controlled toward a richer side, while, when the factor "$\alpha$" is less than "1", the air-fuel ratio is controlled toward a leaner side. FIG. 3(A) shows an output signal issued from the upper oxygen sensor 18, and FIG. 3(B) shows fluctuation of the feedback correction factor "α" with respect to the output signal from the upper oxygen sensor 18. The feedback correction factor "5" is derived through the above-mentioned proportional-plus-integral deriving method. That is, when the output from the upstream oxygen sensor 18 is turned from a richer side toward a leaner side crossing the predetermined slice level, a certain proportional amount "PL" is added to the correction factor "α" and at the same time an integral amount having a gradient given by a predetermined integration constant "IL" is gradually added to the correction factor "α". As is seen from the equation (2), the basic fuel injection quantity "Tp" is multiplied by the correction factor "α", and thus, the air-fuel ratio of the mixture actually fed to the engine is gradually shifted toward richer side. When then the output from the upstream oxygen sensor 18 is turned from the leaner side to the richer side, a certain proportional amount "PR" is subtracted from the correction factor "α" and at the same time an integral amount having a gradient given by a predetermined integration constant "IR" is gradually subtracted from the correction factor "α". These addition and subtraction are repeated, so that the actual air-fuel ratio of the mixture is kept in the vicinity of the stoichiometric while making a small fluctuation with a period of about 1 to 2 Hz.

When it is necessary to enrich the mixture due to for example lower temperature of the engine cooling water and high speed and high load condition of the engine, or when a fuel cut takes place during deceleration of the vehicle, the feedback correction factor "α" is fixed to 1 (one). Under this condition, an open loop control is carried out in the system.

As will be described in the following, the output from the downstream oxygen sensor 19 is used for correcting an inevitable deviation of the feedback control based on the output from the upstream oxygen sensor 18.

That is, also to the output from the downstream oxygen sensor 19, the proportional-plus-integral deriving method is applied for deriving a secondary correction factor "αi". By using this secondary correction factor "αi", the above-mentioned proportional amounts "PL" and "PR" are corrected, that is:

$$PL = PL + \alpha i \quad (3)$$

$$PR = PR - \alpha i \quad (4)$$

As a result of this correction, the output from the downstream oxygen sensor 19 is forced to show the rich/lean reverse with a relatively long period.

According to the present invention, the following measure is further provided, which will be described with reference to FIG. 4.

Figure 4:
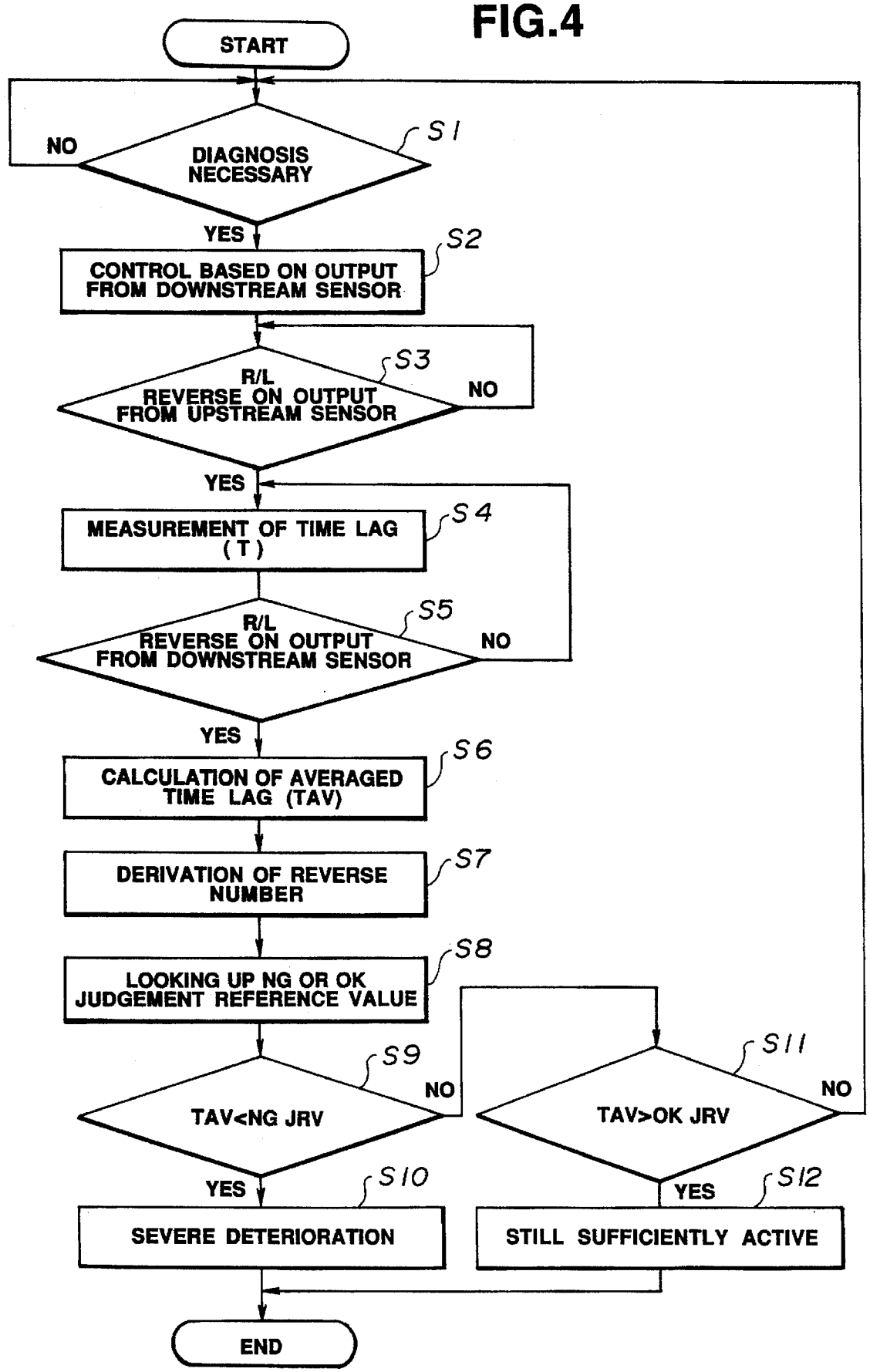
FIG. 4 is a flowchart showing programmed operation steps for achieving a diagnosis of catalyst deterioration.
Figure 5:
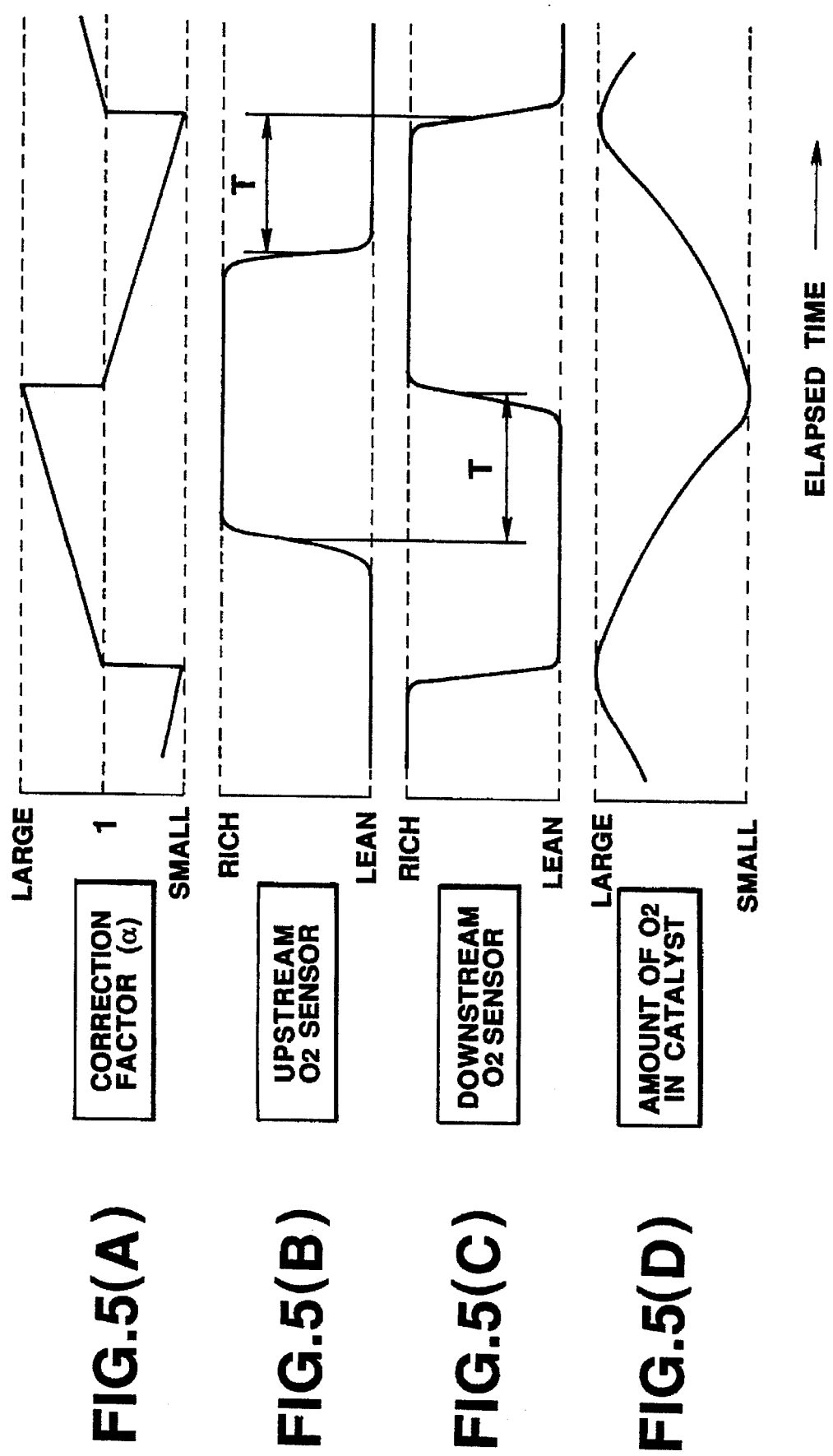
FIGS. 5(A) to 5(D) are charts showing respectively a feedback correction factor, an output signal from an upstream oxygen sensor, an output signal from a downstream oxygen sensor and an amount of oxygen possessed by catalyst, with respect to elapsed time, which appear during the diagnostic operation with the air-fuel ratio control being based on the output signal from the downstream oxygen sensor.

Referring to FIG. 4, there is shown a flowchart for carrying out a diagnosis of catalyst deterioration according to the first embodiment of the invention.

In practice, a preliminary diagnosis for the catalyst is carried out based on the ratio of reverse period between the output from the upstream oxygen sensor 18 and that from the downstream oxygen sensor 19, and only when the preliminary diagnosis teaches that the catalyst has been deteriorated to a certain degree, the operation steps shown in the flowchart of FIG. 4 are carried out for achieving a proper diagnosis according to the present invention.

First, at step S1, a judgement is carried out as to whether the existing state of the engine necessitates the diagnosis of catalyst deterioration or not. If NO, that is, when the state of the engine does not need such diagnosis, the diagnosis is not carried out.

If YES at step S1, that is, when the engine is under a condition which needs the diagnosis, the operation flow goes to step S2. In this step, the air-fuel ratio feedback control which has been based on the output from the upstream oxygen sensor 18 switches to another feedback control which is based on the output from the downstream oxygen sensor 19. This feedback control on the output from the downstream oxygen sensor 19 is carried out in substantially the same manner as that on the output from the upstream oxygen sensor 18. That is, by carrying out the above-mentioned proportional-plus-integral deriving method on the rich/lean reverse of the output from the downstream oxygen sensor 19, the feedback correction factor "α" is derived. The basic fuel injection quantity "Tp" is multiplied by the feedback correction factor "α" now derived, so that the air-fuel ratio of mixture fed to the engine shows in its average the stoichiometric while making a periodic fluctuation. Because of the oxygen storage performance of the catalyst in the three-way catalytic converter 17, the exhaust gas emitted from the converter 17 fails to precisely respond to the delicate change in the air-fuel ratio of mixture. Thus, when the feedback control is carried out based on the output from the downstream oxygen sensor 19, the rich-lean fluctuation of the real air-fuel ratio becomes large and the period is elongated, as is seen from the graphs of FIGS. 5(A) to 5(D).

After step S2, the operation flow goes to steps S3 and S5. At steps S3, the rich/lean reverses of the output signal from the upstream oxygen sensor 18 are detected. At step S5, the rich/lean reverses of the output signal from the downstream oxygen sensor 19 are detected. At step S4, by counting the elapsed time from the time on which a rich/lean reverse of the output from the upstream sensor 18 just begins to the time on which the corresponding rich/lean reverse of the output from the downstream sensor 19 just begins, a time lag "T" (see FIGS. 5(B) and 5(C)) between the two output signals is derived or detected each time the rich/lean reverse takes place. As has been described hereinabove, this time lag "T" increases as the oxygen storage ability of the catalyst of the converter 17 increases. This will be seen from FIG. 7 which shows the relationship between the oxygen storage ability of the catalyst and the time lag "T".

At step S6, the running average "$T_{AV}$" (or running means) of the time lag "T" is derived.

Figure 6:
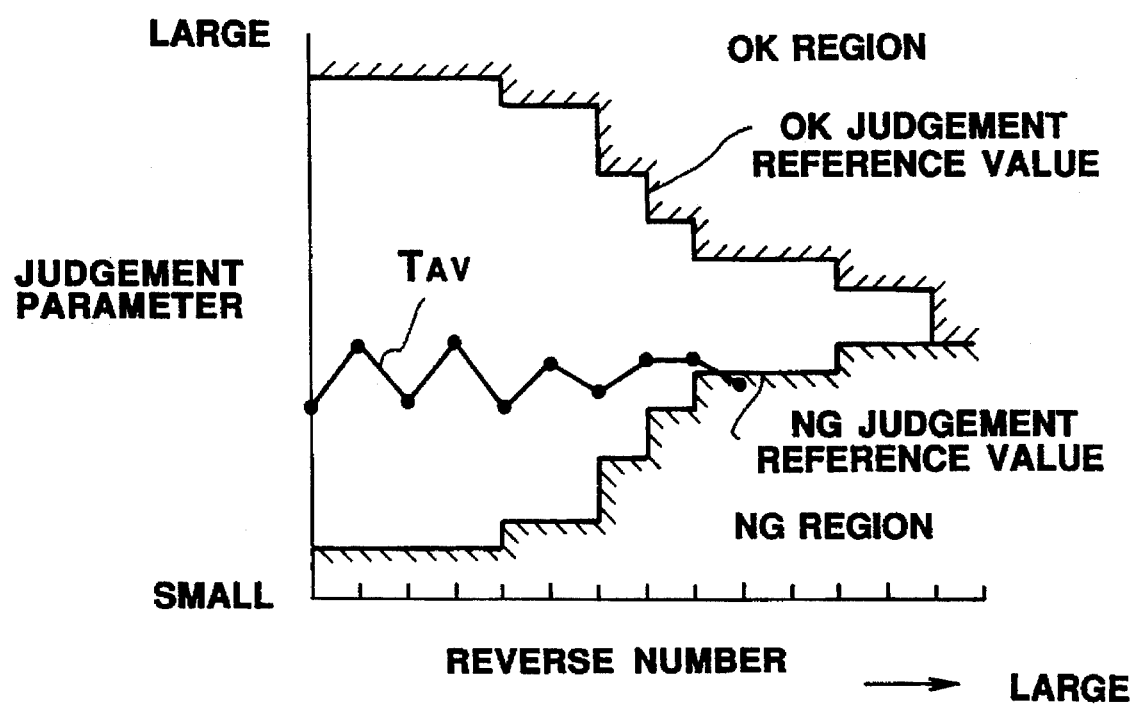
FIG. 6 is a judging table showing a relationship between the degree of rich/lean reverse period and a judgement reference value.

At step S7, the number of times (which will be referred to "reverse number" hereinafter) for which the measurement of the time lag "T" was repeated is derived, and at step S8, judgement reference values, more specifically, OK judgement reference value and NG judgement reference values corresponding to the reverse number are looked up from a predetermined data map. The OK judgement reference value corresponds to such a level that the catalyst is still sufficiently active, and the NG judgement reference value corresponds to such a level that the catalyst is severely deteriorated. These judgement reference values are plotted in the judgement table of FIG. 6 with respect to the reverse number.

Then, at step 9, a judgement is carried out as to whether the running average "$T_{AV}$" is smaller than the NG judgement reference value or not. If YES, that is, when the running average "$T_{AV}$" is smaller than the NG judgement reference value, the alarm lamp 24 (see FIG. 2) is lighted (step S10) indicating that the catalyst has been severely deteriorated. While, if NO at step 9, the operation flow goes to step S11. At this step, a judgement is carried out as to whether the running average "$T_{AV}$" is greater than the OK judgement reference value or not. If YES, that is, when the running average "$T_{AV}$" is greater than the OK judgement reference value, the judgement is so made that the catalyst is still sufficiently active (step 12). When the diagnosis of catalyst deterioration is finished, the air-fuel ratio feedback control is returned back to the original mode based on the output from the upstream oxygen sensor 18.

If NO at step S11, that is, when the running average "$T_{AV}$" is within a border zone between the NG and OK judgement reference values, the judgement is suspended and the operation flow goes back to step S1 for repeating measurement of the time lag "T". That is, as will be understood from the polygonal line in FIG. 6, the measurement of the time lag "T" is repeated until the running average "$T_{AV}$" becomes lower than the NG judgement reference value or higher than the OK judgement reference value.

Accordingly, when the deterioration degree of the catalyst is very small or very severe, the catalyst deterioration diagnosis operation can be finished early. Furthermore, when the deterioration of the catalyst is in a delicate degree, the measurement of the time lag "T" is repeated, which induces a high preciseness on the NG and OK judgements. Thus, the period for which the air-fuel feedback control is carried out based on the output from the downstream oxygen sensor 19 is shortened, and thus, a bad influence of such control on the composition of the exhaust gas is minimized.

Figure 7:
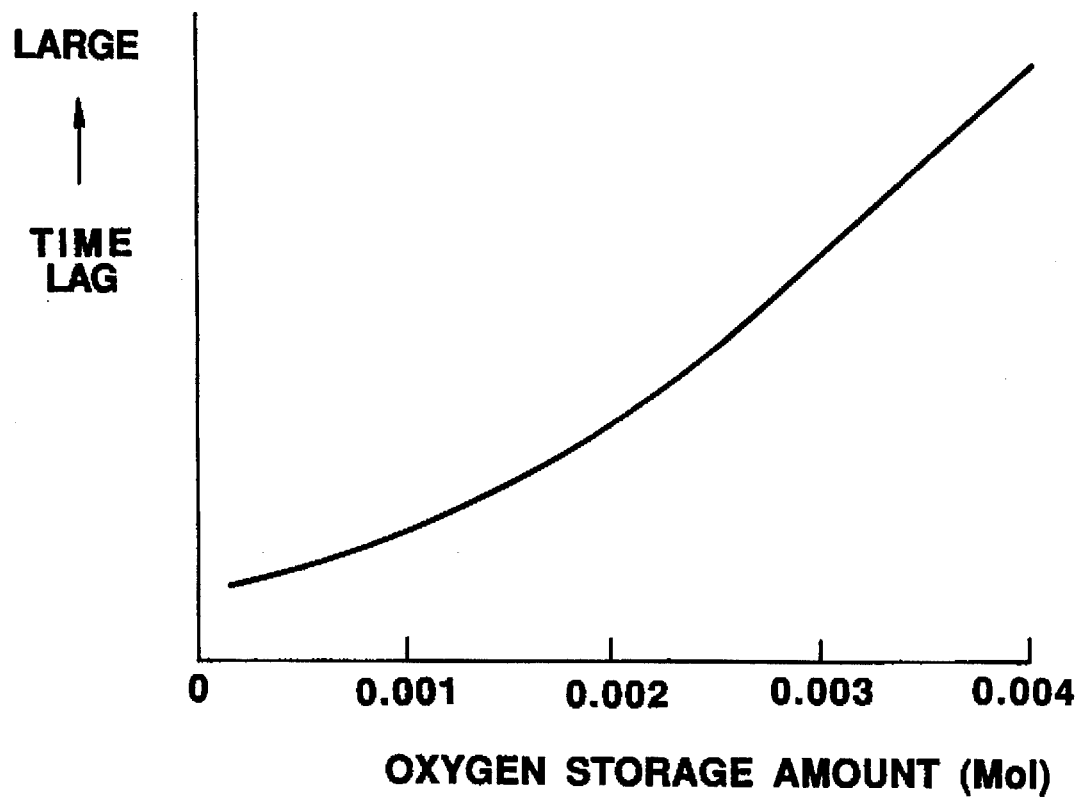
FIG. 7 is a graph showing a relationship between an oxygen storage ability of catalyst and a time lag.

In the above-mentioned diagnosis of the first embodiment which pays attention to the time lag "T", NG or OK judgement on the activity of catalyst can be issued at any deterioration degree of the catalyst because the time lag "T" changes simply and smoothly relative to the oxygen storage ability of the catalyst as shown in the graph of FIG. 7.

Figure 8:
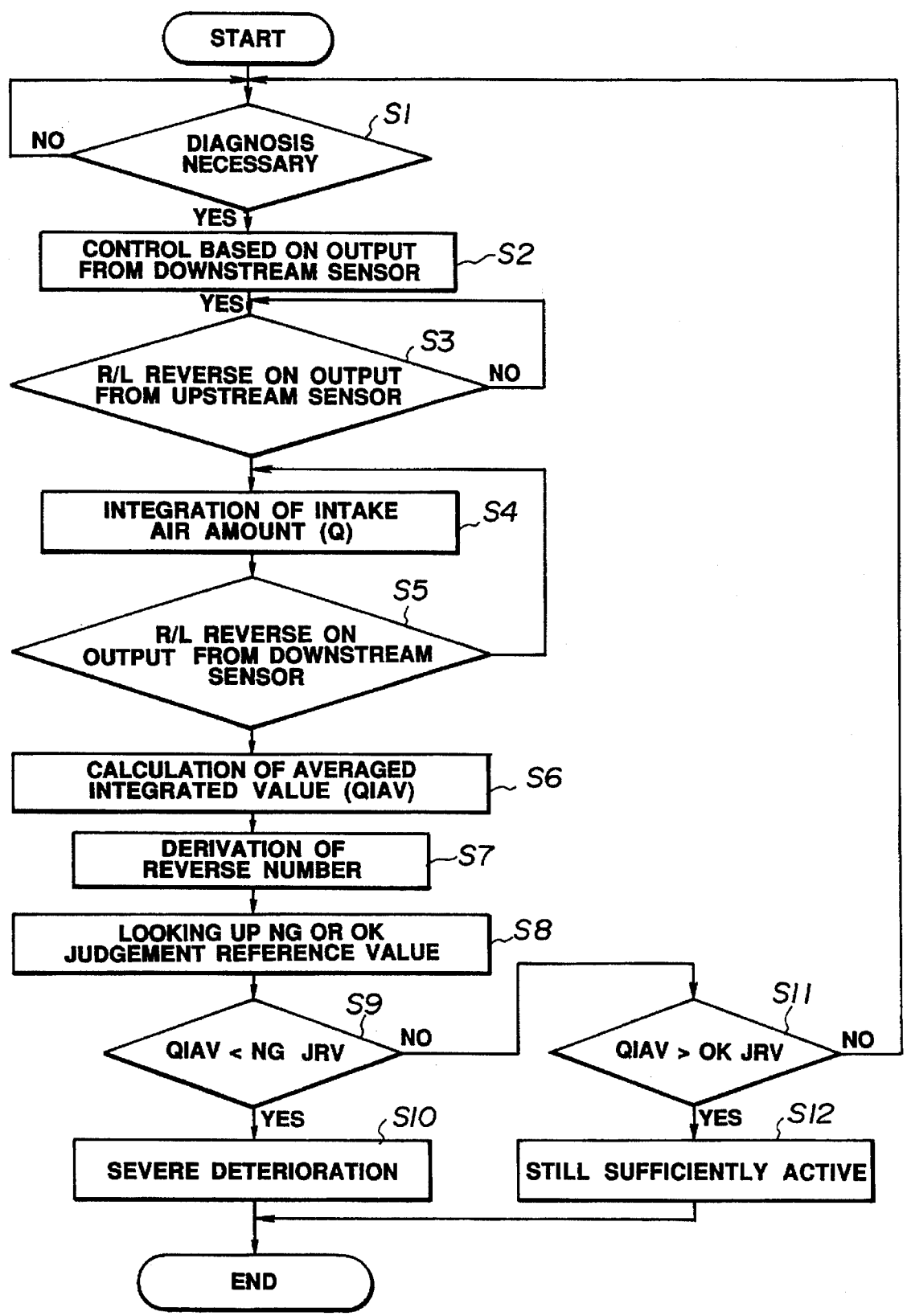
FIG. 8 is a flowchart showing programmed operation steps carried out in a second embodiment of the present invention wherein an integrated value of intake air amount is used as a judging parameter.

Referring to FIG. 8, there is shown a flowchart for carrying out a diagnosis of catalyst deterioration according to the second embodiment of the present invention.

Since the second embodiment is similar to the above-mentioned first embodiment, only portions which are different from the first embodiment will be described in the following.

That is, in the second embodiment, within the elapsed time from the time on which the rich/lean reverse of the output from the upstream oxygen sensor 18 just begins to the time on which the corresponding rich/lean reverse of the output from the downstream oxygen sensor 19 just begins, an intake air amount "Q" of the engine 11, which changes successively, is integrated (step S4) to obtain an integrated value "QI" At step S6, the average "$QI_{AV}$" of the integrated value "QI" is derived, which is used as a judgement parameter. That is, the average "$QI_{AV}$" is provided by averaging integrated values which are derived each time the rich/lean reverse takes places in the output signals from the first and second oxygen sensors. The integrated value "QI" of the intake air amount "Q" corresponds to the amount of exhaust gas which passes through the three-way catalytic converter 17 for the time lag. Thus, even when the engine speed "N" changes frequently, the integrated value "QI" can correctly represent the oxygen storage ability of the catalyst, and thus, much accurate NG or OK judgement is obtained on the activity of the catalyst.

Because, as has been described hereinabove, the basic fuel injection quantity "Tp" is proportional to "Q/N" (see equation (1)), the integrated value "QI" of the intake air amount "Q" can be obtained by integrating the basic fuel injection quantity "Tp" (or practically injected fuel quantity "Ti") each time the rich/lean reverse occurs within the time lag.

Figure 9:
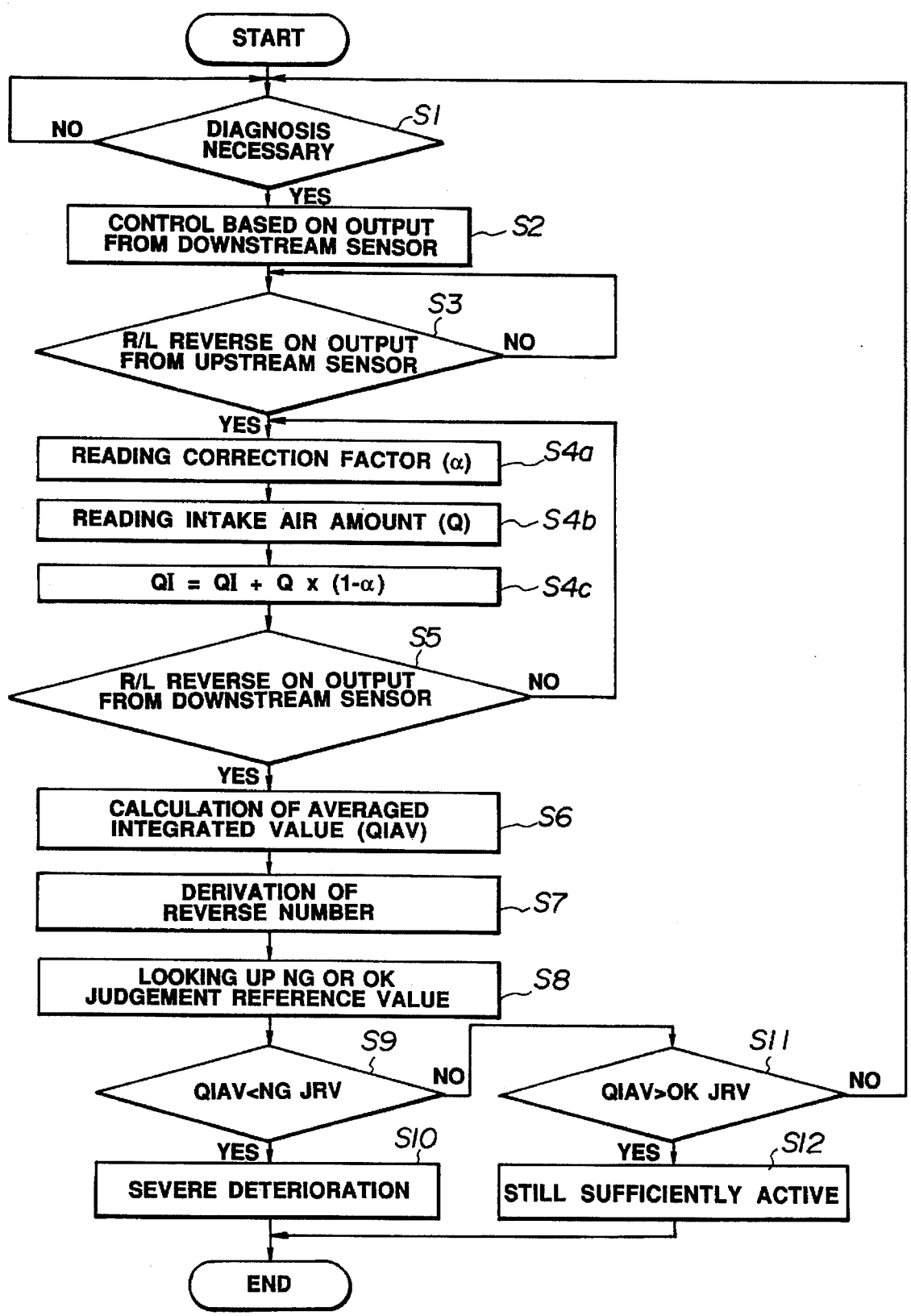
FIG. 9 is a flowchart showing programmed operation steps carried out in a third embodiment of the present invention wherein the integrated value of intake air amount is corrected by an air-fuel ratio.
Figure 12:
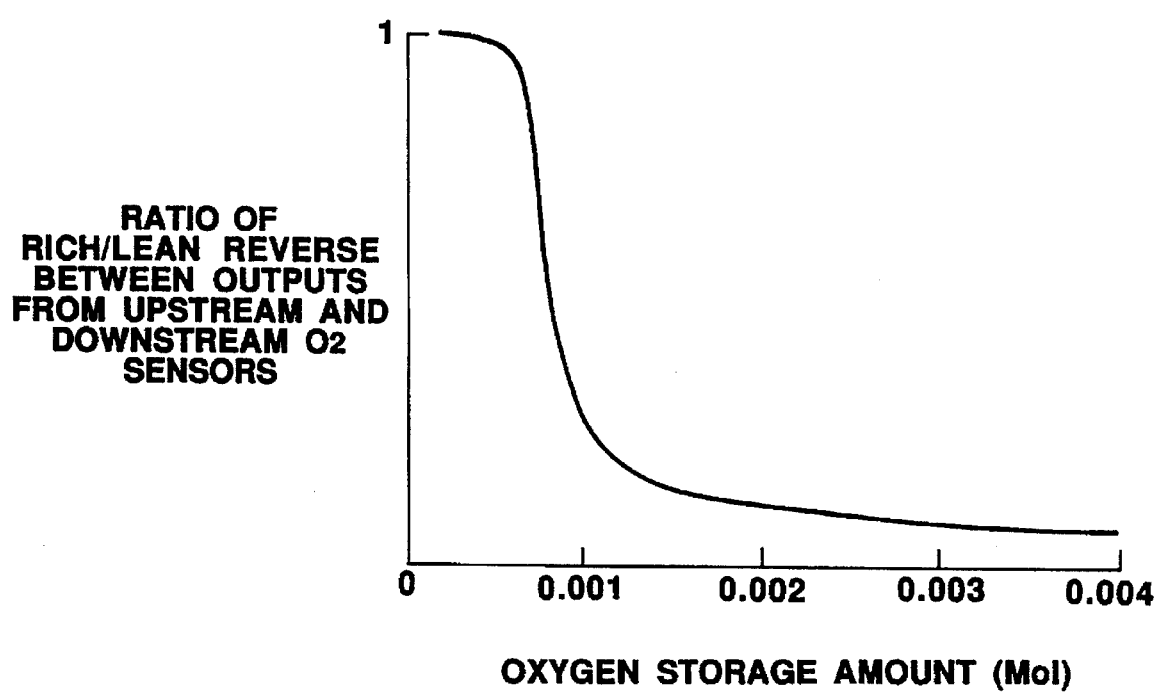
FIG. 12 is a graph showing a relationship between the oxygen storage ability of catalyst and a ratio of rich/lean reverse period between output signals from the upstream and downstream sensors, which relationship is used practically in the conventional catalyst deterioration diagnosing system.

Referring to FIG. 9, there is shown a flowchart for carrying out a diagnosis of catalyst deterioration according to the third embodiment of the present invention.

Since the third embodiment is similar to the above-mentioned second embodiment, only portions which are different from the second embodiment will be described in the following.

That is, in the third embodiment, the integrated value "QI" of the intake air amount "Q" within the time lag is further corrected by the air-fuel ratio. In this embodiment, the air-fuel ratio for correcting the integrated value "QI" is represented by the afore-mentioned feedback correction factor "α". That is, at step S4a, within the time lag, the feedback correction factor "α" is read successively, and at step S4b, the intake air amount "Q" is read, and at step S4c, the following equation (5) is executed every given time to obtain an integrated value "QI".

$$QI=QI+Q\times(1-\alpha) \qquad (5)$$

Accordingly, the influence of the air-fuel ratio on the time lag is canceled, and thus, the oxygen storage ability of the catalyst can be more accurately judged.

When, like in the case just after starting the engine, the temperature of the catalyst is still low, the oxygen storage ability of the catalyst is relatively low. FIG. 10 is a table showing NG and OK judgement reference values with respect to the temperature (viz., higher temperature, middle temperature and lower temperature) of the catalyst, which is employed in a fourth embodiment of the present invention. That is, for example, if the exhaust gas temperature sensor 22 senses the exhaust gas from the converter 17 being highly heated, the NG and OK judging reference values are determined according to the polygonal solid line in FIG. 10. When the sensor 22 senses the exhaust gas from the converter 17 being moderately heated, the judging reference values are determined in accordance with the polygonal broken line, and when the sensor 22 senses that the temperature of the exhaust gas from the converter 17 is relatively low, the judging reference values are determined in accordance with the polygonal phantom line. In this embodiment, the deterioration degree of the catalyst can be precisely judged even when the temperature of the catalytic converter 17 is relatively low. Thus, it never occurs that, irrespective of less deterioration of the catalyst, NG judgement is issued due to lowering of the oxygen storage ability caused by the lower temperature of the catalyst.

As will be understood from the foregoing description, in the catalyst deterioration diagnosing system according to the present invention, the deterioration of the three-way catalytic converter can be judged in a quantitative manner, and the NG and OK judgement reference values can be set up at desired values at will. Accordingly, it never occurs that, irrespective of sufficient catalytic activity remained in the catalyst, NG judgement is erroneously given, and irrespective of severe deterioration of the catalyst, OK judgement is erroneously given. That is, quite precise NG and OK judgments on the activity of the catalyst are carried out in the present invention.

What is claimed is:

1. A system for diagnosing deterioration of a catalyst of a three-way catalytic converter installed in an exhaust system of an internal combustion engine, comprising:

first and second oxygen sensors installed in said exhaust system at respective positions upstream and downstream of said converter;

an air-fuel ratio control means which usually controls in a feedback control manner the air-fuel ratio of mixture fed to the engine in accordance with an output signal issued from said first oxygen sensor;

a time lag detecting means which detects the elapsed time from the time on which the output signal from said first oxygen sensor carries out a rich-lean reverse to the time on which the output signal from said second oxygen sensor carries out a corresponding rich-lean reverse; and a judging means which judges a deterioration degree of the catalyst in accordance with said time lag, wherein said air-fuel ratio control means includes means for causing a step change, upon a given diagnosing mode thereof, in a feedback correction factor in synchronization with the rich-lean reverse of the output signal from said second oxygen sensor, thereby correcting said air-fuel ratio of mixture to a generally stoichiometric value.

2. A system as claimed in claim 1, in which said time lag used for judging the deterioration degree of the catalyst is an average value of time lags which are measured each time the rich/lean reverse takes place in the output signals from the first and second oxygen sensors.

3. A system for diagnosing deterioration of a catalyst of a three-way catalytic converter installed in an exhaust system of an internal combustion engine, comprising:

first and second oxygen sensors installed in said exhaust system at respective positions upstream and downstream of said converter;

an air-fuel ratio control means which usually controls in a feedback control manner the air-fuel ratio of mixture fed to the engine in accordance with an output signal issued from said first oxygen sensor;

a time lag detecting means which detects the elapsed time from the time on which the output signal from said first oxygen sensor carries out a rich-lean reverse to the time on which the output signal from said second oxygen sensor carries out a corresponding rich-lean reverse; and a judging means which judges a deterioration degree of the catalyst in accordance with said time lag, wherein said air-fuel ratio control means includes means for correcting, upon a given diagnosing mode thereof, said air-fuel ratio of mixture to a generally stoichiometric value in accordance with the rich-lean reverse of the output signal issued from said second oxygen sensor, wherein said time lag used for judging the deterioration degree of the catalyst is an average value of time lags which are measured each time the rich-lean reverse takes place in the output signals from the first and second oxygen sensors; and wherein said judging means includes:

first means for detecting the number of times for which the measurement of the time lag is repeated;

second means for deriving a judgment reference value in accordance with said number of times; and third means for comparing said judgment reference value with the averaged time lag to judge the deterioration degree of the catalyst.

4. A system as claimed in claim 3, in which said judgement reference value derived by said second means includes NG and OK judgement reference values which are plotted in a predetermined judgement table.

5. A system as claimed in claim 4, in which said judging means further comprises fourth means which suspends the judgement on the deterioration of the catalyst when the averaged time lag is within a border zone between the NG and OK judgement reference values.

6. A system as claimed in claim 5, in which the measurement of the time lag is repeated until said averaged time lag becomes lower than the NG judgement reference value or higher than the OK judgement reference value.

7. A system for diagnosing deterioration of a catalyst of a three-way catalytic converter installed in an exhaust system of an internal combustion engine, comprising:

first and second oxygen sensors installed in said exhaust system at respective positions upstream and downstream of said converter;

an air-fuel ratio control means which usually controls in a feedback control manner the air-fuel ratio of mixture fed to the engine in accordance with an output signal issued from said first oxygen sensor;

a time lag detecting means which detects the elapsed time from the time on which the output signal from said first oxygen sensor carries out a rich-lean reverse to the time on which the output signal from said second oxygen sensor carries out a corresponding rich-lean reverse; and a judging means which judges a deterioration degree of the catalyst in accordance with said time lag, wherein said air-fuel ratio control means includes means for correcting, upon a given diagnosing mode thereof, thereby correcting said air-fuel ratio of mixture to a generally stoichiometric value in accordance with the rich-lean reverse of the output signal from said second oxygen sensor, the system further comprising:

an integrating means which integrates the amount of intake air fed to the engine within said time lag to obtain an integrated valve, wherein said judging means judges the deterioration degree of the catalyst in accordance with said integrated value.

8. A system as claimed in claim 7, in which said integrated value used for judging the deterioration degree of the catalyst is an average of integrated values which are derived each time the rich/lean reverse takes place in the output signals from the first and second oxygen sensors.

9. A system as claimed in claim 8, in which said judging means includes:

first means for detecting the number of times for which the measurement of the time lag is repeated;

second means for deriving a judgement reference value in accordance with said number of times; and third means for comparing said judgement reference value with said average of the integrated values to judge the deterioration degree of the catalyst.

10. A system as claimed in claim 9, in which said judgement reference value derived by said second means includes NG and OK judgement reference values which are plotted in a predetermined judgement table.

11. A system as claimed in claim 10, in which said judging means further comprises fourth means which suspends the judgement of the deterioration of the catalyst when said average of integrated values is within a border zone between the NG and OK judgement reference values.

12. A system as claimed in claim 11, in which the measurement of the integrated value is repeated until said average of integrated values becomes lower than the NG judgement reference value or higher than the OK judgement reference value.

13. A system as claimed in claim 7, further comprising:

a correction means which corrects said integrated value in accordance with the air-fuel ratio of mixture.

14. A system as claimed in claim 3, further comprising:

temperature detecting means for detecting the temperature of the catalyst; and correcting means for correcting said judgement reference value in accordance with the catalyst temperature detected by said temperature detecting means.

15. A system for diagnosing deterioration of a catalyst of a three-way catalytic converter installed in an exhaust system of an internal combustion engine, comprising:

first and second oxygen sensors installed in said exhaust system at respective positions upstream and downstream of said converter;

an air-fuel ratio control means which usually controls the air-fuel ratio of mixture fed to the engine in accordance with an output signal issued from said first oxygen sensor, said control means being capable of correcting, upon a given diagnosing mode thereof, said air-fuel ratio of mixture to a generally stoichiometric value in accordance with a rich/lean reverse of an output signal issued from said second oxygen sensor;

a time lag detecting means which detects the elapsed time from the time on which the output signal from said first oxygen sensor carries out a rich/lean reverse to the time on which the output signal from said second oxygen sensor carries out a corresponding rich/lean reverse; and a judging means which judges a deterioration degree of the catalyst in accordance with said time lag;

wherein said time lag used for judging the deterioration degree of the catalyst is an average value of time lags which are measured each time the rich/lean reverse takes place in the output signals from the first and second oxygen sensors; and wherein said judging means includes first means for detecting the number of times for which the measurement of the time lag is repeated;

second means for deriving a judgement reference value in accordance with said number of times; and third means for comparing said judgement reference value with the averaged time lag to judge the deterioration degree of the catalyst.

16. A system as claimed in claim 15, in which said judgement reference value derived by said second means includes NG and OK judgement reference values which are plotted in a predetermined judgement table.

17. A system as claimed in claim 16, in which said judging means further comprises fourth means which suspends the judgement on the deterioration of the catalyst when the average time lag is within a border zone between the NG and OK judgement reference values.

18. A system as claimed in claim 17, in which the measurement of the time lag is repeated until said averaged time lag becomes lower than the NG judgement reference value or higher than the OK judgement reference value.

19. A system as claimed in claim 15, further comprising:

an integrating means which integrates the amount of intake air fed to the engine within said time lag to obtain an integrated value, wherein said judging means judges the deterioration degree of the catalyst in accordance with said integrated value.

20. A system as claimed in claim 19, in which said integrated value used for judging the deterioration degree of the catalyst is an average of integrated values which are derived each time the rich/lean reverse takes place in the output signals from the first and second oxygen sensors.

21. A system as claimed in claim 20, in which said judging means includes:

first means for detecting the number of times for which the measurement of the time lag is repeated;

second means for deriving a judgement reference value in accordance with said number of times; and third means for comparing said judgement reference value with said average of the integrated values to judge the deterioration degree of the catalyst.

22. A system as claimed in claim 21, in which said judgement reference value derived by said second means includes NG and OK judgement reference values which are plotted in a predetermined judgement table.

23. A system as claimed in claim 22, in which said judging means further comprises fourth means which suspends the judgement of the deterioration of the catalyst when said average of integrated values is within a border zone between the NG and OK judgement reference values.

24. A system is claimed in claim 23, in which the measurement of the integrated value is repeated until said average of integrated values becomes lower than the NG judgement reference value or higher than the OK judgement reference value.

25. A system as claimed in claim 19, further comprising:

a correction means which corrects said integrated value in accordance with the air-fuel ratio of mixture.

26. A system as claimed in claim 15, further comprising:

temperature detecting means for detecting the temperature of the catalyst; and correcting means for correcting said judgement reference value in accordance with the catalyst temperature detected by said temperature detecting means.

* * * * *